Figure 4:
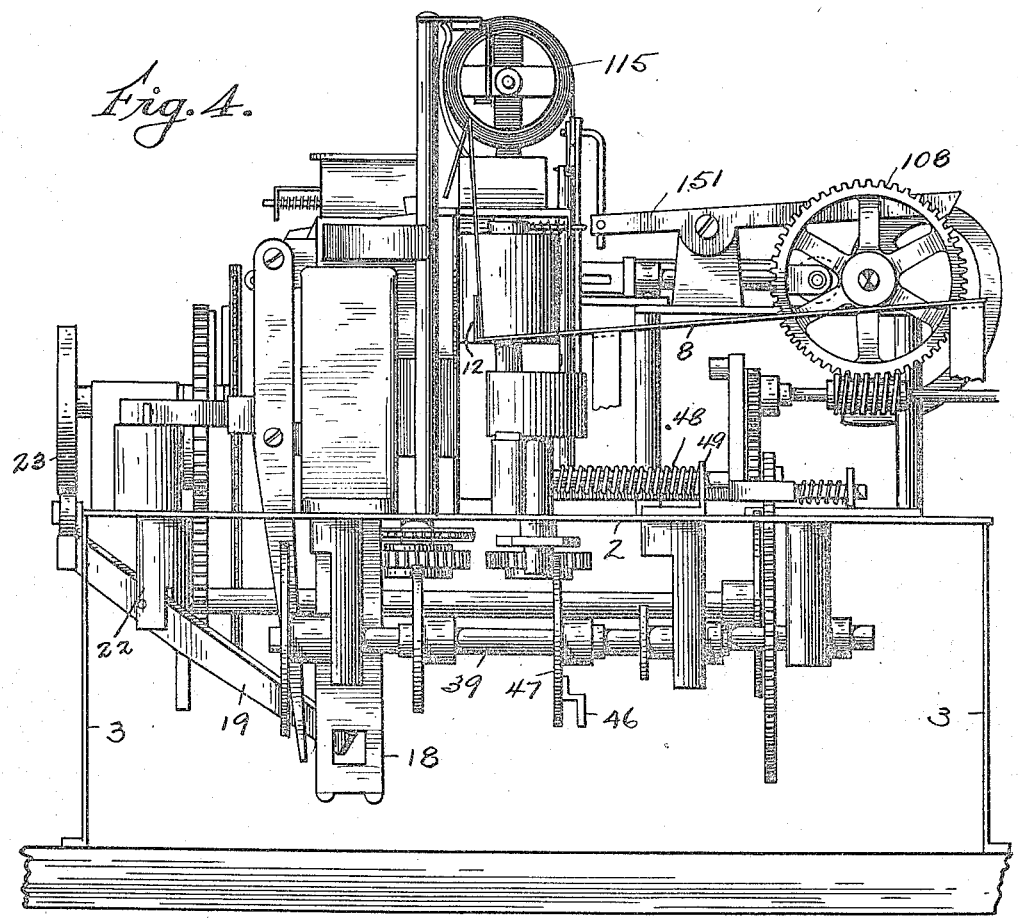

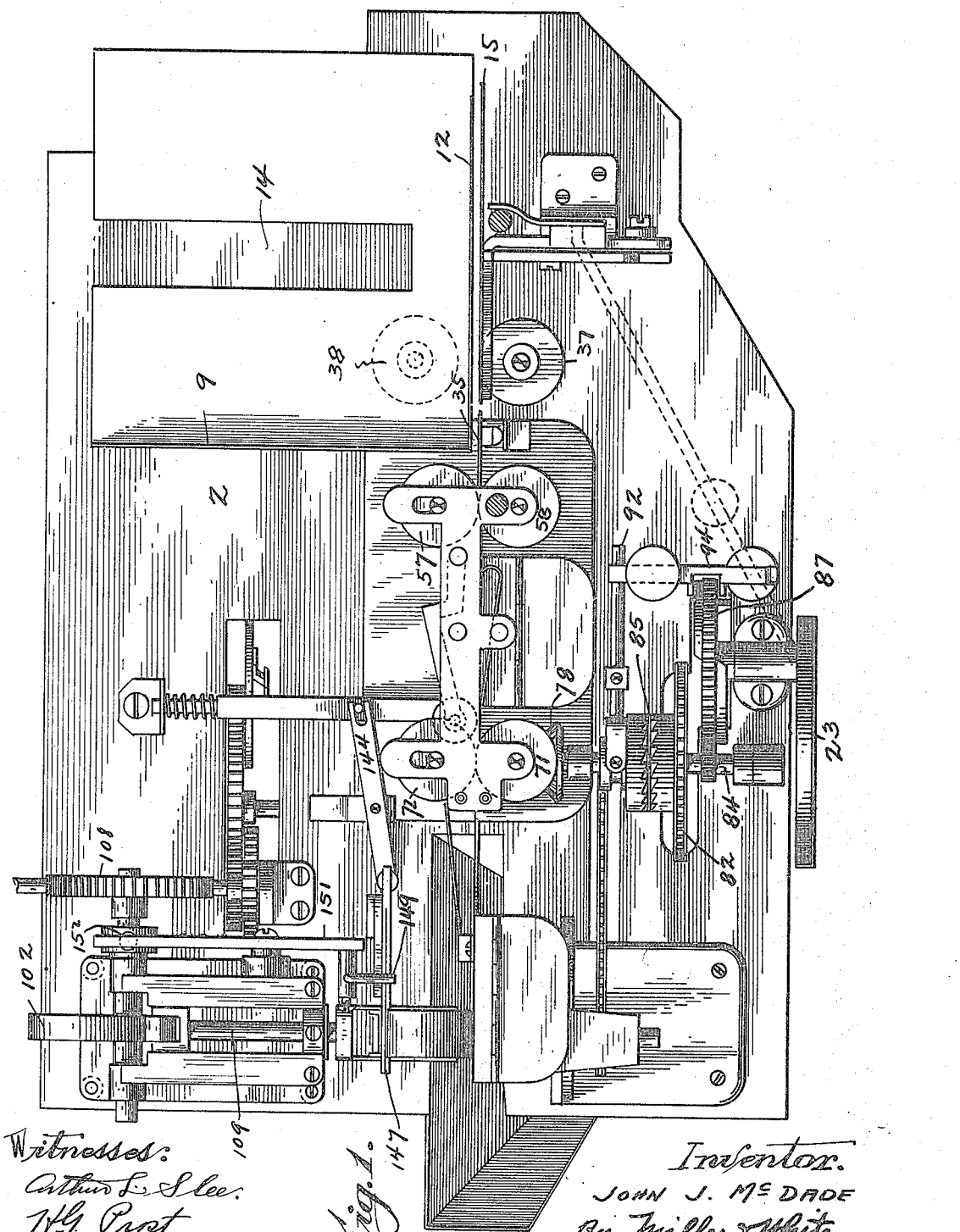

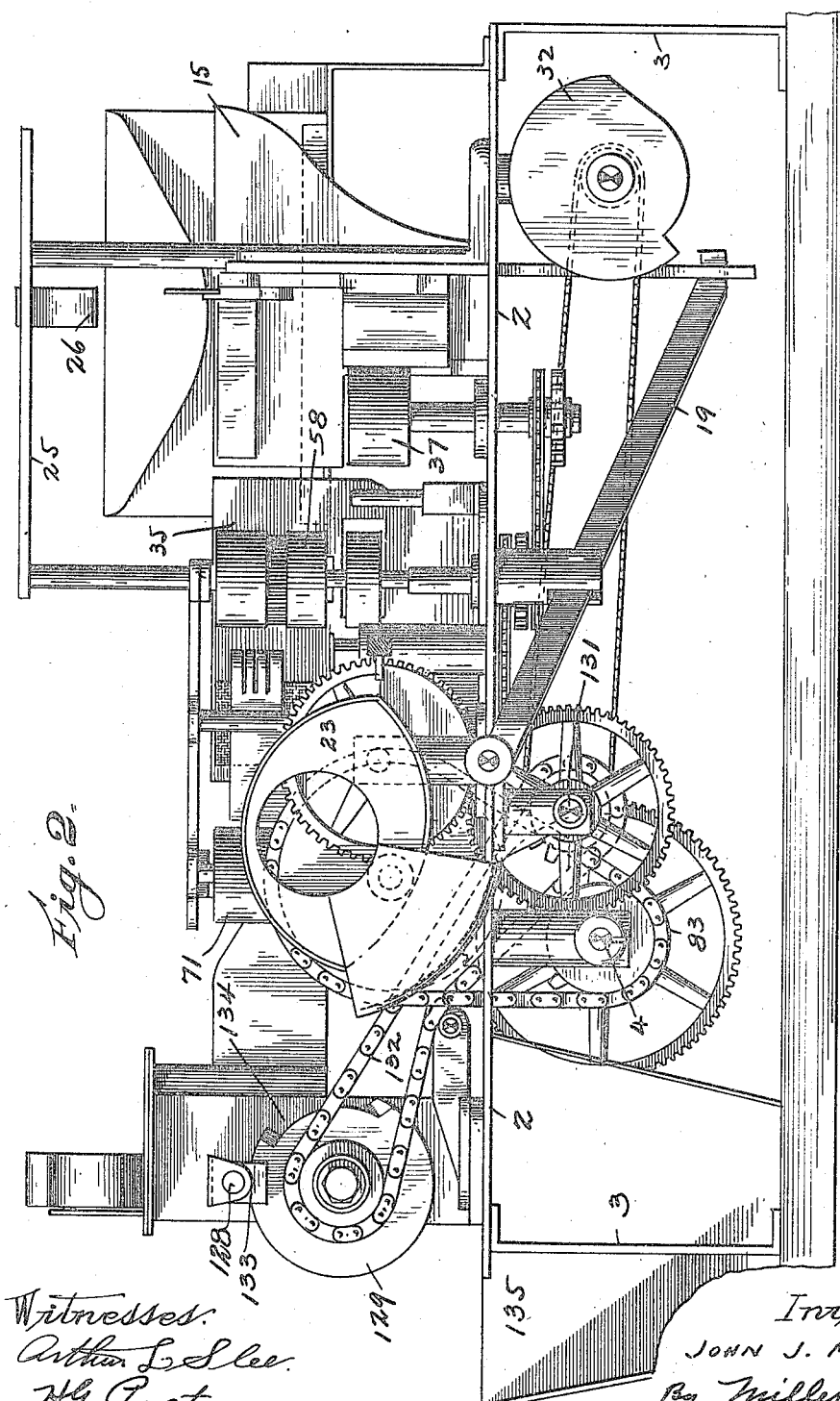

J. J. McDADE.
ENVELOP SEALING AND STAMP AFFIXING MACHINE.
APPLICATION FILED MAR. 8, 1911.
1,153,325.
Patented Sept. 14, 1915.
10 SHEETS—SHEET 3.
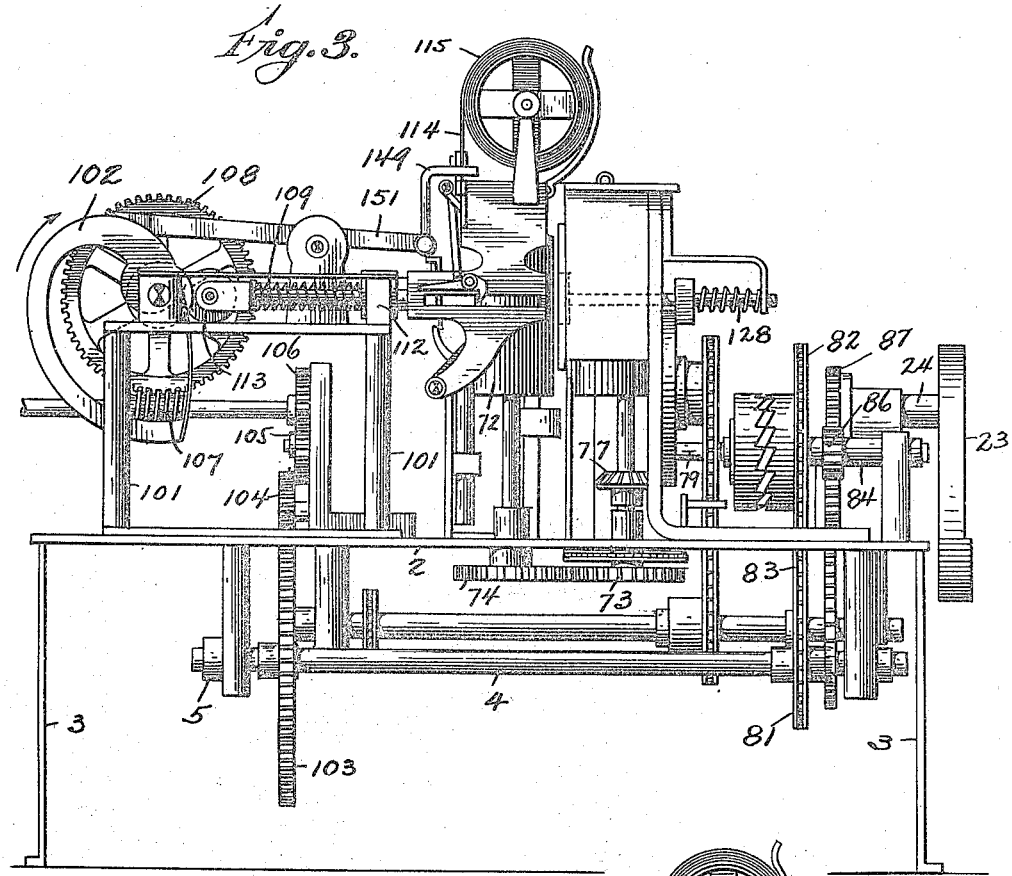
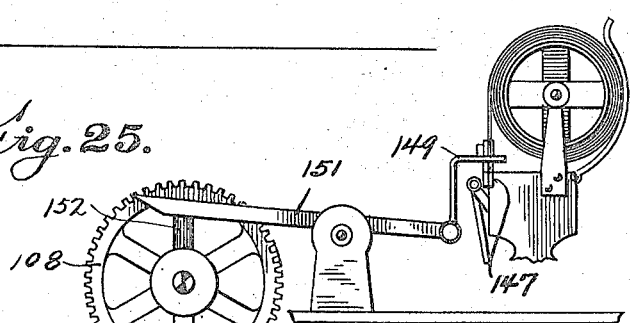
Witnesses:
Arthur L. Slee
W. G. Prost
Inventor:
JOHN J. McDADE
By Miller & White
his Attorneys

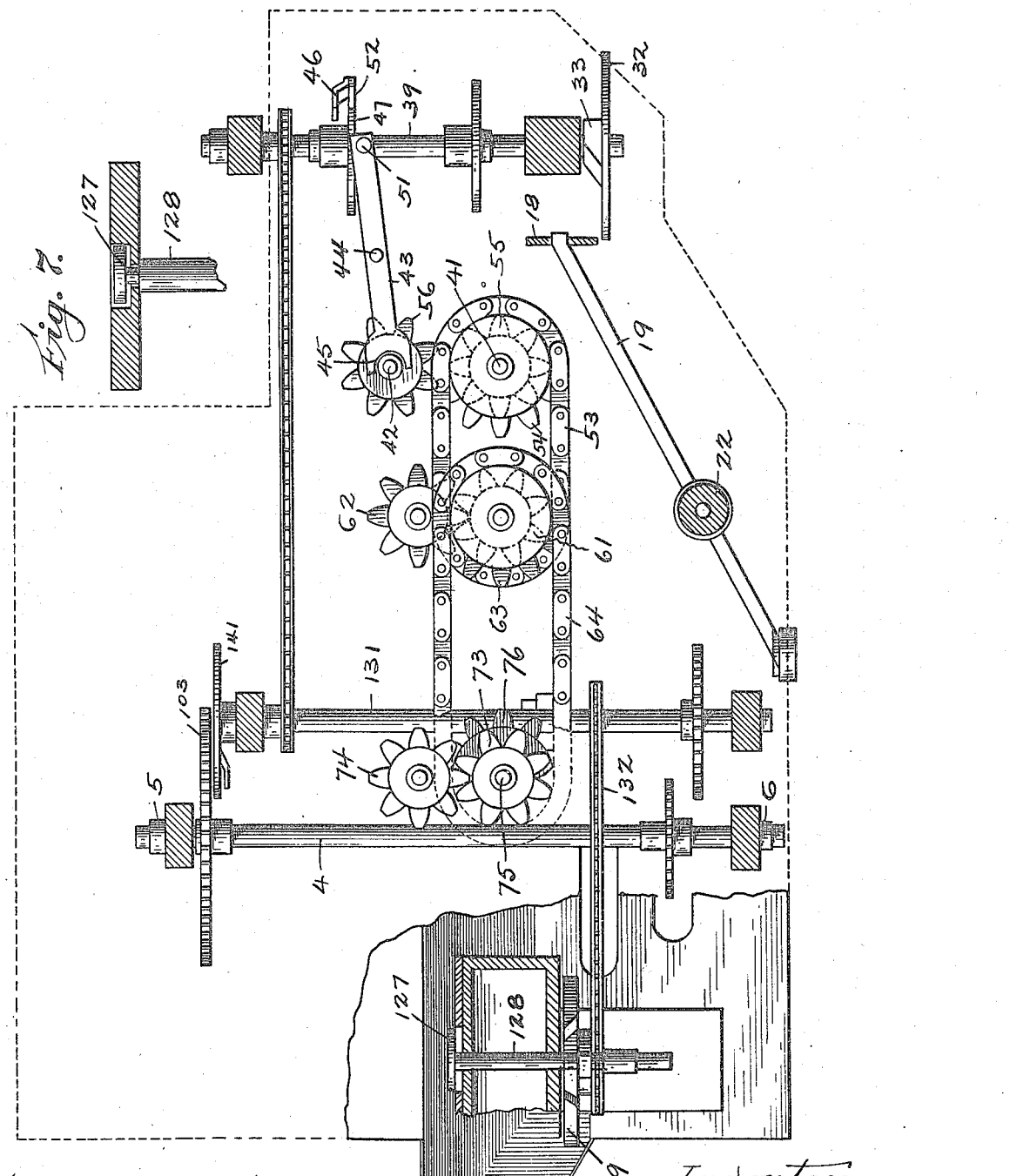

J. J. McDADE.
ENVELOP SEALING AND STAMP AFFIXING MACHINE.
APPLICATION FILED MAR. 8, 1911.
1,153,325.
Patented Sept. 14, 1915.
10 SHEETS—SHEET 6.
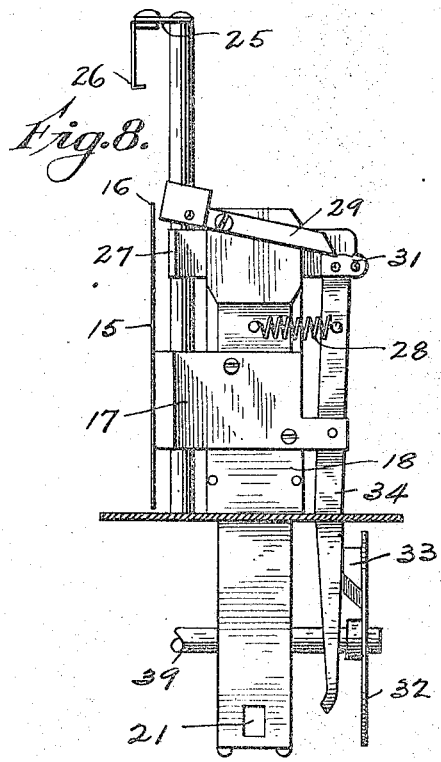
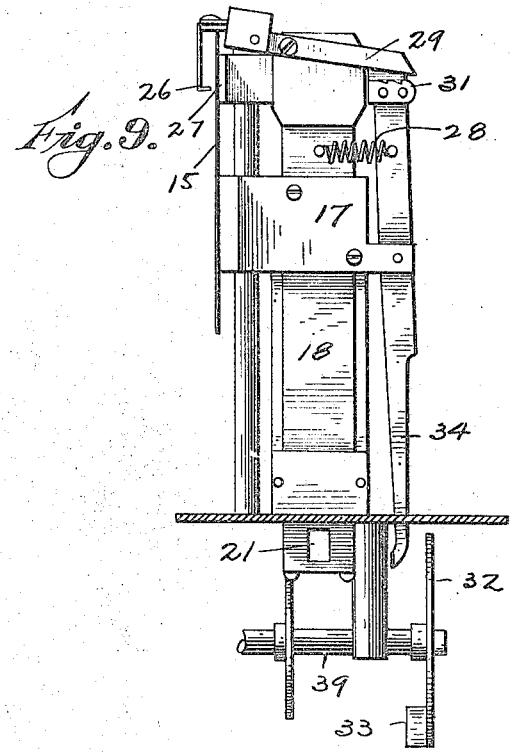
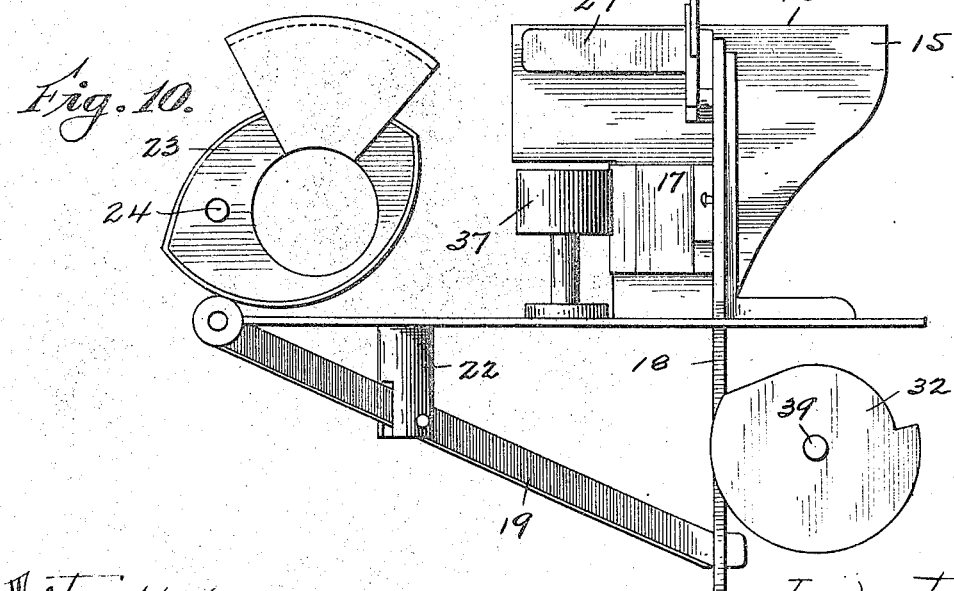
Witnesses:
Arthur L. Slee.
N. G. Prost.
Inventor
JOHN J. McDADE
By Miller & White
his attorneys

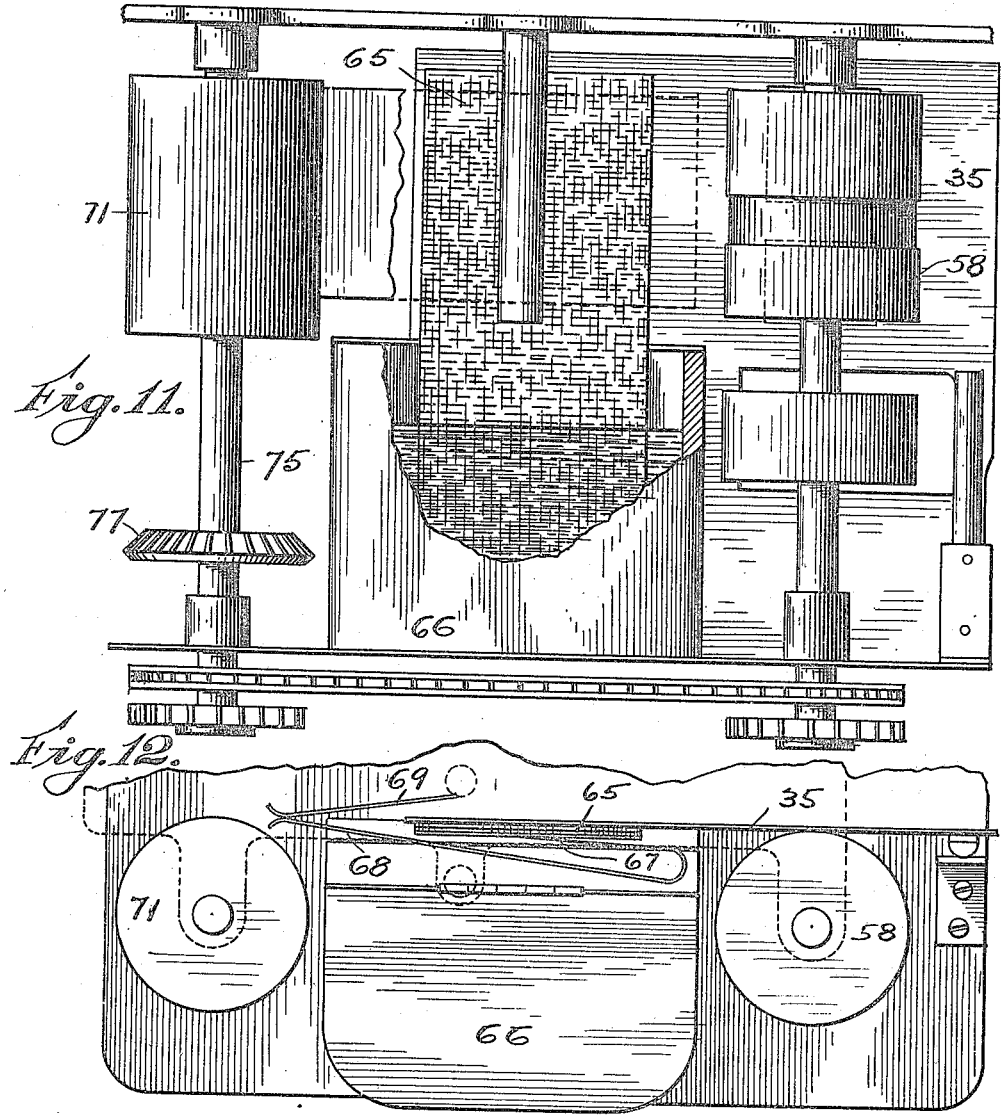

J. J. McDADE.
ENVELOP SEALING AND STAMP AFFIXING MACHINE.
APPLICATION FILED MAR. 8, 1911.
1,153,325.
Patented Sept. 14, 1915.
10 SHEETS—SHEET 8.
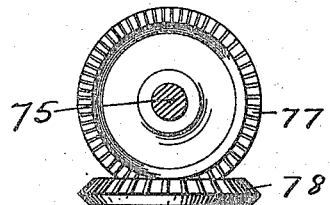
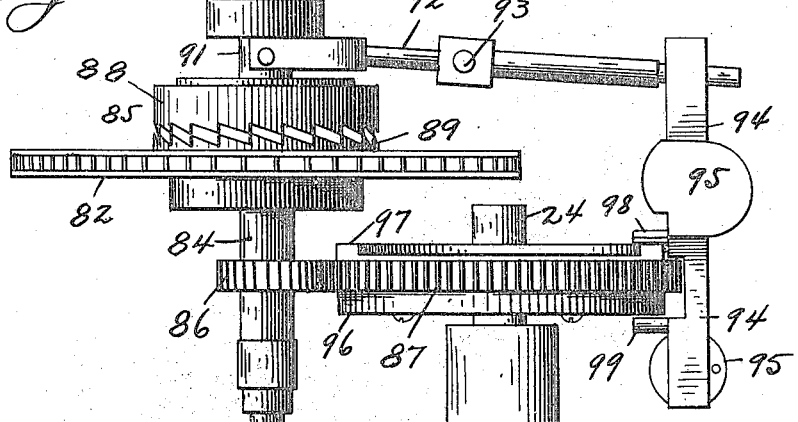
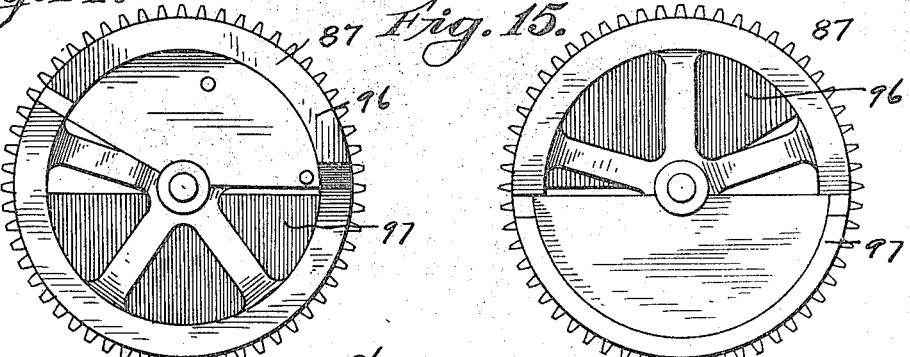
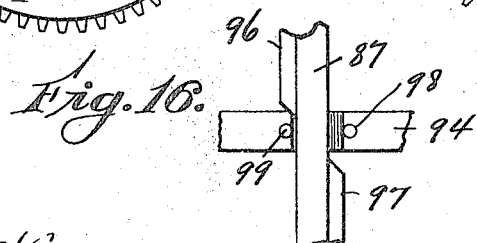
Witnesses:
Arthur L. Slee
N.G. Prnt.
Inventor.
JOHN J. McDADE
By Miller & White
his attorney

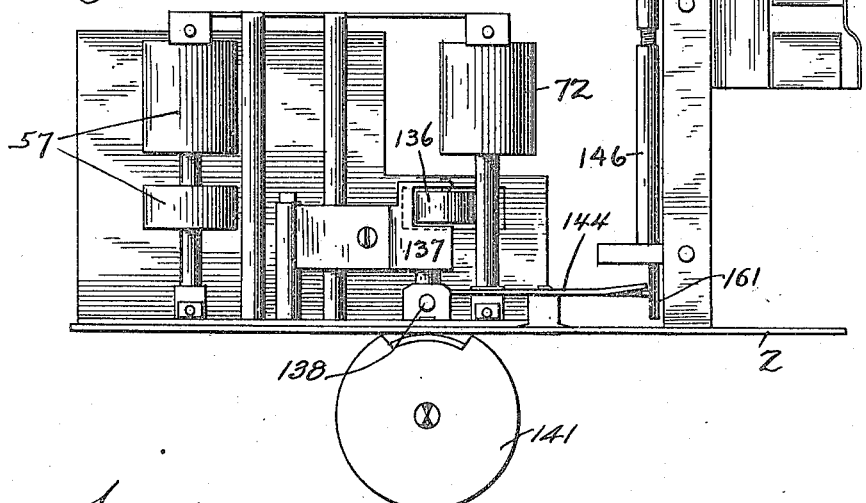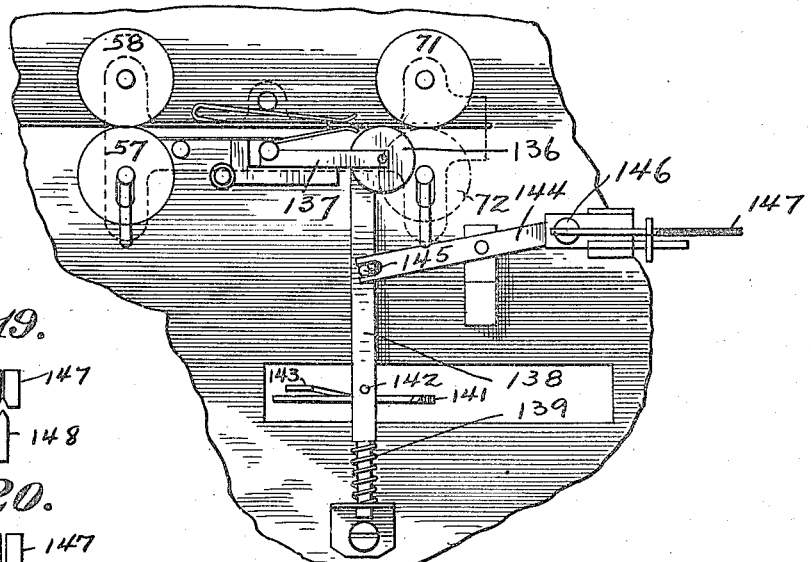

J. J. McDADE.
ENVELOP SEALING AND STAMP AFFIXING MACHINE.
APPLICATION FILED MAR. 8, 1911.

1,153,325.

Patented Sept. 14, 1915.
10 SHEETS—SHEET 10.

Witnesses:
Arthur L. Slee.
H. J. Prost.

Inventor
JOHN J. McDADE
By Miller & White
his Attorneys

UNITED STATES PATENT OFFICE.

JOHN J. McDADE, OF SAN FRANCISCO, CALIFORNIA.

ENVELOP-SEALING AND STAMP-AFFIXING MACHINE.

1,153,325.  Specification of Letters Patent.  Patented Sept. 14, 1915.

Application filed March 8, 1911. Serial No. 613,159.

*To all whom it may concern:*

Be it known that I, JOHN J. McDADE, a citizen of the United States, and a resident of the city and county of San Francisco and State of California, have invented new and useful Improvements in Envelop-Sealing and Stamp-Affixing Machines, of which the following is a specification.

The invention relates to machines for sealing envelops and affixing stamps thereto and more particularly to machines which are automatic in operation and which perform the successive steps of sealing and stamping the envelop as it is carried through the machine.

The object of the invention as a whole is to provide a machine of the class described which is simple in construction and which operates with a high degree of efficiency and reliability.

Another object of the invention is to provide a machine which will operate on envelops of all sizes, and efficiently seal and stamp them without the necessity of adjusting the various parts to accommodate the envelops of various sizes.

Another object of the invention is to provide a machine wherein the various elements are so arranged that the envelop is carried through the machine in a straight line.

A further object is to provide an improved means for feeding the envelops singly into the sealing and stamping mechanism.

A further object of the invention is the provision of an improved moistening device and means for guiding the envelop as it passes the moistener.

A further object is to provide a stamp affixing mechanism which is arranged to be operated during the period that the envelop is held at rest by the sealing mechanism after the sealing operation has been performed.

A further object is to provide regulating means governed by the passage of the envelop for throwing the stamp affixing mechanism in or out of operation.

Another object of the invention is to provide driving mechanism for the feed and sealing rollers which is arranged to advance the envelop to the proper position, and hold it in such position during the stamp affixing operation.

The present machine comprises and the invention includes an improved feed-table whereby the envelops into which the mail matter has been placed are maintained in such position that the end envelop is always in position to be extracted from the stack and fed into the machine. The envelops are placed in an upright position on the feed table with the flap end of the envelop upward and the back or flap-side of the envelop facing the extracting device. The envelops are alined on the table by causing the front or leading ends thereof to contact with a lip on the side of the plate, thereby causing each envelop to be fed into the sealing and stamping mechanism with the front or leading edge in the same relation to the extractor-plate, regardless of the size of the envelop. The extractor plate is caused to move vertically in such a path that in its upward movement it will engage the end envelop and lift it from the stack. The extractor plate is then brought into position, so that the envelop may be fed into the sealing mechanism.

The sealing mechanism comprises among other parts a guide plate over which the envelop rides, feeding rollers, and a moistening device for moistening the gum on the flap and sealing rollers for securely sealing the flap to the body of the envelop. The mechanism for driving the feeding and sealing rollers is provided with a clutch operating automatically to stop the movement of the rollers when the envelop has been moved the required distance so that the forward end is in position to receive the stamp.

The device for affixing the stamp comprises a mechanism into which the stamps are fed from a roll and which operates to tear the stamp from the strip along the line of perforation to moisten the stamp and to properly affix it to the envelop.

Another feature of the invention consists of an automatic control mechanism which is thrown into operation when the envelops are not passing through the machine to halt the operation of the stamp affixer. This control mechanism acts to throw the stamp affixer out of operation when there is no envelop passing through the sealer or with the stamp affixer in inoperative relation to throw it into operation with the passage of an envelop.

The invention consists also of novel means for adjusting and feeding the envelops when they are initially placed in or on the machine.

It consists further of a novel construction of feeding plate or members which engage the flap of an envelop to extract the same from the stack and move it into engagement with the feeding rollers.

It consists further of a novel construction of a moistening device by means of which only the flap of the envelop will be moistened and the envelop advanced to suitable flap-bending members before it passes between the sealing rollers provided therefor.

It further consists of novel means for holding the envelop in a stationary position during a predetermined interval to allow the stamp affixer mechanism to apply the stamp to the envelop.

It consists further of a novel construction of stamp-feeding mechanism and novel means for rendering the same inoperative when desired.

It consists further of novel means for removing an envelop from the machine after the same has been sealed and stamped.

It further consists of novel means for arranging and correlating the envelop feeding mechanism, the sealing rollers, the holding means, the stamping mechanism, the envelop discharging mechanism and their adjuncts, whereby when the machine is in operation the different operations hereinbefore mentioned are simultaneously carried out.

The apparatus possesses other advantageous features, which, with the foregoing, will be set forth at length in the following description where I shall outline in full that form or embodiment of my invention which I have selected for illustration in the drawing accompanying and forming part of the present specification.

From this it will be apparent that I do not restrict myself to the showing made by such drawings and descriptions, as it is evident that many variations and changes in detail may be made without varying from the spirit of my invention.

Figure 5:
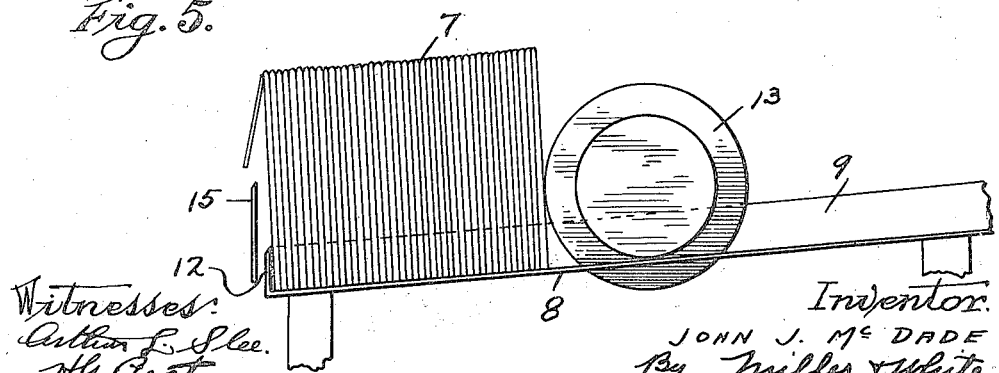
Figure 21:
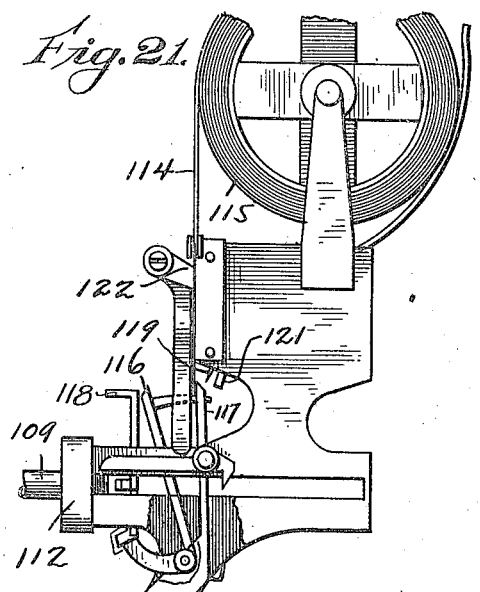
Figure 22:
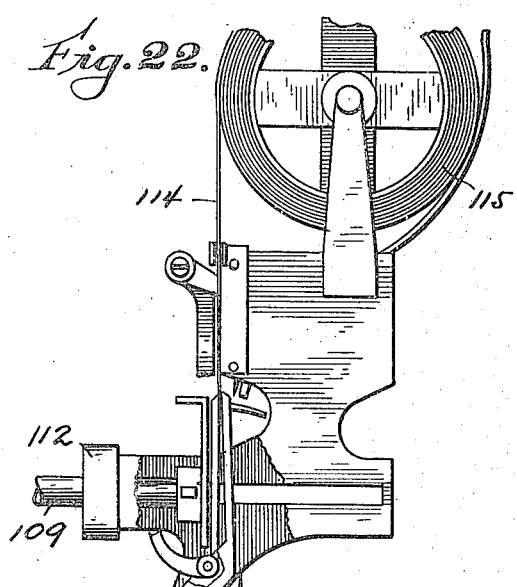
Figure 23:
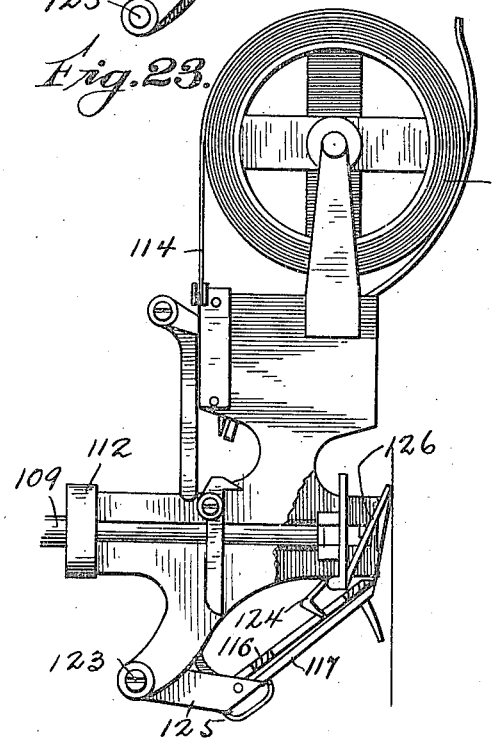
Figure 24:
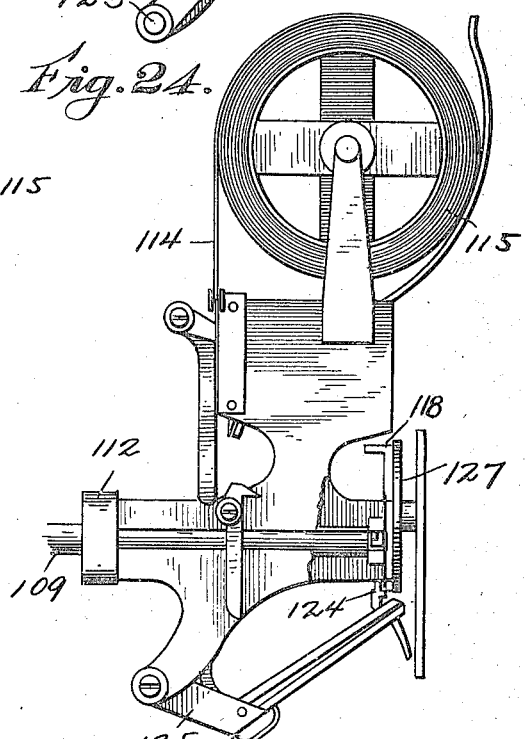

Figure 1 is a general plan or top-view of the envelop sealing and stamp affixing device embodying my invention. Fig. 2 is a front elevation showing an envelop in position on the feed table. Fig. 3 is an end elevation showing the stamp-affixer mechanism and the means of operation therefor. Fig. 4 is an elevation of the opposite end showing the mechanism by which the envelops are fed into the machine. Fig. 5 is a detail view of the feed table showing a stack of envelops in position, and the relative position of the selector plate with regard to the first envelop. Fig. 6 is a plan or top-view of the operating mechanism for the various devices. Fig. 7 is a detail of that part of the plate against which the envelop is pressed during the stamp-affixing operation. Figs. 8, 9 and 10 are details of the feed mechanism for removing the envelops from the stack; Figs. 8 and 9 being end views of the apparatus in the lowered and raised positions and Fig. 10 being a side view of the apparatus in the lowered position. Fig. 11 is a side elevation of the feeding and sealing rollers and the moistening device, part of the receptacle and pressure springs being broken away. Fig. 12 is a plan or top view of the feeding and sealing rollers, the moistening device and the pressure springs for closing the moistened flap against the body. Fig. 13 is a detail of a clutch and cut out mechanism for operating the feed and sealing rollers. Figs. 14, 15 and 16 are details of the cam-gear used in the mechanism shown in Fig. 13; Figs. 14 and 15 being elevations of the opposite sides, and Fig. 16 being a partial end view showing the cams on opposite sides of the gear. Fig. 17 is an elevation of the sealing mechanism showing the means for automatically throwing the stamp strip out of contact with the stamp affixer. Fig. 18 is a plan or top view of the mechanism shown in Fig. 17. Figs. 19 and 20 are details of the mechanism by which the stamp-strip is disengaged from the stamp-affixing mechanism. Figs. 21, 22, 23 and 24 are detail views of the stamp-affixer in four different positions, showing the successive steps of gripping, drawing, moistening, severing and affixing the stamp. Fig. 25 is a detail of the mechanism for locking the gripper jaws through which the stamp-strip passes.

Referring to the drawings, in the detailed description of my novel envelop sealing and stamp affixing machine, it will be understood that I have shown but one embodiment of the broad principle of my invention, since it is apparent that the same may be carried out in various forms of mechanisms or organizations without departing from the spirit of my invention.

The present invention in its entirety comprises several distinct sets of mechanism which coöperate and are dependent on each other to produce the ultimate objects or results sought for, and I will, therefore, describe each of the same in detail and in the natural or logical sequence in which they are thrown into operation.

The frame of the machine consists preferably of a horizontal base plate 2, which is held a sufficient distance above the surface or table upon which the machine is placed, by the legs 3, to allow the various gears and driving mechanism to be arranged below the bed. The main driving shaft 4, to which power is applied to drive the mechanism, is arranged below the bed 2 and is suitably journaled in the bearings 5—6 which are supported from the bed, and the various gears for driving the mechanisms are connected or secured thereto.

*The envelop feeding mechanism.*—I will first describe the construction employed for feeding the envelops into the machine, which construction is primarily a part of the complete machine and not to be considered as an isolated mechanism.

The envelops 7 are placed or arranged on an inclined table 8 in an upright position with the flap end upward and the flap facing the mechanism which is arranged to remove the envelops from the stack. The envelops are arranged so that the edges of the envelops bear against a lip 9 on the inner side of the table, thereby holding the front or entering edges of the envelops alined and in proper relation to the remainder of the feeding mechanism so that the separate envelops are fed to the rolls in the proper position.

The forward envelop, or that one which is in position to be removed from the stack, bears against a lip 12 on the lower end of the table, and is thereby held in the proper position. The remaining envelops of the stack are held in position against the leading one and are advanced as the forward ones are removed by means of the roller 13, which rolls on the table 8 and is guided by the slot 14 in the table. In this manner a positive feed of the envelops toward the lip 12 is insured.

In Fig. 5 is shown a side elevation of the feed table 8 with a stack of envelops in position showing the position of the extractor plate 15 which operates with other mechanism to remove the forward envelop from the stack and feed it into the machine. The flap of the envelop will protrude slightly from the back of the envelop, due to the material in the envelop and the extractor plate 15 is arranged to enter under the flap and lift the envelop from the stack and clear of the lip 12.

The mechanism for operating the extractor plate 15 is shown in Figs. 8, 9 and 10, wherein the mechanism is shown in various operative positions.

The plate 15 which may be of any desired shape is provided with a sharpened or chamfered top edge 16 for entering under the flap of the envelop. The plate is carried by the bracket 17 which is secured to a vertically disposed bar or plate 18. Vertical motion is imparted to the bar 18 by means of a lever 19, engaging a slot 21 in the lower portion of the bar. The lever 19 is pivoted to the bracket 22 secured to the lower side of the bed and is operated by the cam 23 mounted on the shaft 24 which is operated from the main-shaft.

The selector-plate 15 rises and engages the envelop under the flap and lifts it from the stack and clear of the lip 12. The plate 15 rises until the upper edge of the envelop comes in contact with the stop-plate 25 which alines the envelop on the plate 15.

A toe-piece 26 is provided on the stop-plate and is so arranged as to allow only one envelop to be raised by the plate 15 and to stop and hold back any other envelops that may stick or adhere thereto. At this point of the operation while the carrying-plate is in contact with the stop piece 25, a foot 27 which is pulled toward the plate 15 by the spring 28 is released by means of the pawl 29, disengaging the ratchet 31 on the foot. The pawl 29 is tripped by the opposite end thereof coming in contact with the stop-piece 25. The foot 27 springs against the flap of the envelop and presses it firmly against the plate 15, thereby holding the envelop perfectly alined. The plate 15 is then lowered carrying the envelop with it in the downward movement. When the plate has reached its lowest position, the plate 32, carrying the cam 33, has revolved to such a position that the cam 33 comes in contact with the lower end of the lever 34, with the effect of moving the foot-piece away from the envelop and setting the pawl 29 in contact with the ratchet 31. The envelop now rests freely on the selector plate and is in position to be fed to the moistening and sealing device. The plate 32 carrying the cam 33 is mounted on the shaft 39 which is arranged below the bed and connected to the main shaft 4 by suitable means so that it makes one complete revolution for one complete operation of the selector plate 15.

The envelops are so arranged in position on the feed table 8 that when they are carried downward by the selector plate, the upper edge of the carrier-plate 35 enters between the flap and the body of the envelop at its forward or leading end, and acts as a guide for the envelop as it passes the moistening and sealing devices. The guide plate 35 is fixed to the bed so that it stands substantially perpendicular thereto, and is arranged in line with the selector plate 15. The upper edge of the guide plate 35 lies in the same plane with the upper edge of the selector plate, when the last named member is in the lower position, and the adjacent edges of the two plates occur close together, so that the envelop can readily pass from the selector plate to the guide plate.

*The auxiliary feed.*—For the purpose of feeding the envelops from the selector plate to the main-feeding rollers, I have arranged a pair of auxiliary feed rollers 37—38 on opposite sides of the selector-plate. I have used the term auxiliary merely for convenience and not for the purpose of description, and said rolls are not to be considered secondary in any sense. The selector plate is cut away at the lower part of the forward edge and the rollers are arranged on opposite sides of the plate at such cut away portion, so that the rolls may engage the envelop on both sides and feed it forward.

The rolls 37—38 are mounted on the vertical shafts 41—42 which are rotated from the main driving shaft. The shaft 42 carrying roll 38 is arranged to be moved laterally to separate the rolls to allow the envelop to enter between them, and to be brought together to engage the envelop and feed it forward at the required time in the operation of the machine.

The shaft 42 is moved laterally by means of a lever 43 pivoted at 44 to the lower side of the bed. The lever is provided with a forked end 45 for engaging the shaft 42 and is moved by means of the cam 46 on the disk 47 on the shaft 39. The operation of the cam 46 is timed so that the rolls will be brought together at the proper time and be held together during the proper interval to feed the envelop forward.

The roll 38 is pressed toward roll 37 and against the envelop by means of the coiled spring 48 which bears against the bracket 49 secured to the bed and against the shaft 42. The pin 51 on the end of lever 43, therefore, continually bears against the face of the disk 47. The disk 47 is provided with an aperture 52 through which the pin 51 drops allowing the roller 38 to move toward roller 37. The cam 46 lying opposite such aperture engages the pin 51 and moves it back to the face of the disk when the rolls 37—38 have been in contact with the envelop for a sufficient time to properly advance it to the main feeding rollers. The aperture 52 in the disk 47 is so placed that the rolls are pressed against the envelop as soon as the selector plate 15 has come to rest in its lower position and the clamping foot 27 has been withdrawn. The shaft 39 must, therefore, make one complete revolution for each complete cycle of the selector apparatus. As the envelop is fed forward, it advances with the upper edge under the flap in contact with the guide plate 35.

The shaft 41 carrying the roller 37 is rotated by means of the chain 53 which meshes with the sprocket wheel 54 on the shaft 41. Mounted on shafts 41—42 are two similar gears 55—56 which are thrown into mesh when the rollers 37—38 are pressed against the envelop and cause the rollers to rotate at the same speed. The teeth of these gears are long so that they will mesh properly regardless of the thickness of the filled envelops. By the mechanism just described, the envelops are carried forward from the selector plate to the main feeding rollers.

*The feeding, moistening and sealing device.*—The main feeding rollers 57—58 are arranged on opposite sides of the guide plate 35 which is apertured adjacent to the rollers, to allow the pressure exerted thereby to be expended in pressing the envelop and not in pressing the envelop against the guide plate. The roller 57 is mounted so that it is capable of a limited lateral movement, so that it may adjust its position to accommodate envelops of various thicknesses. It is evident that only one of these rollers need be adjustable as all of the filled envelop, with the exception of the sealing flap, lies on one side of the guide plate. The adjustable roller is preferably pressed against the other roller by means of a flat spring. The shafts carrying the rollers 57—58 are provided on their lower ends, beneath the bed, with gear wheels 61—62, which engage each other to cause an equal rotation of the two rollers. The teeth of these gears are sufficiently long to allow the gear 62 to be moved laterally the required distance without throwing the gears out of mesh. The shaft carrying roller 58 is provided with a sprocket wheel 63 which is engaged by the chain 64, whereby the feeding rollers are rotated. The connections between this chain and the main driving shaft 4 will be explained hereinafter.

The moistening device is arranged on that side of the guide plate 35, on which the flap of the envelop lies, and is arranged to moisten only the under side of the flap, not allowing the moisture to come in contact with the contents or the body of the envelop before sealing. The moistening device consists of a pad 65 attached to one side of the guide plate near its end and means for supplying moisture to the pad. The pad consists preferably of a flat linen bag containing blotting paper, or other similar substance, which has the property of absorbing water and maintaining itself in a moist condition. A receptacle 66 for supplying moisture to the pad is arranged on the bed plate and is provided with means for refilling when the water supply becomes exhausted. The lower end of the pad lies in the water in the receptacle and the water is drawn upward to moisten the pad.

For the purpose of holding the flap of the envelop against the pad, and insuring the proper moistening thereof, I have provided a spring finger 67 which engages the outer side of the flap and presses the gummed side against the pad as the envelop passes. The edge of the pad and the edge of the guide plate are substantially coincident, so that the flap of the envelop may contact with the body thereof after it has been moistened. After passing the moistening pad and the guide plate, the upper portion of the envelop is engaged by the spring fingers 68—69 which bring the flap properly in contact with the body of the envelop and cause it to adhere thereto.

As the feeding rollers 57—58 continue to advance the envelop, the forward edge thereof passes between the sealing rollers 71—72 which act to press the flap tightly against the body of the envelop and efficiently seal it. The roller 72 is arranged to have a limited lateral motion in the same manner and for the same purpose as the feed roller 57.

The sealing rollers are preferably of the same size and rotate at the same speed as the feeding rollers and after they engage the envelop they also act as feeding rollers to carry the envelop through the machine. The shafts carrying the sealing rollers are provided with the gear 73—74 of similar construction to gears 61—62. The power for driving the feeding and auxiliary feed rollers is transferred from shaft 75, carrying roller 71, to the other shafts by means of the chain 64 which engages the sprocket 76 on the shaft 75. Power is applied to the shaft 75 through the bevel gear 77 mounted thereon which meshes with the bevel gear 78 on the shaft 79 to which power is applied from the main drive shaft 4, through the sprocket wheels 81—82 and the chain 83. The sprocket wheel 82 is mounted on shaft 84 which is in line with shaft 79 and is connected thereto by means of the clutch 85. The shaft 24 carrying the cam 23 is rotated from the shaft 84 by means of gear 86 on shaft 84 and gear 87 on shaft 24.

As the sealing rollers revolve, the envelop is advanced until the leading end thereof comes into the proper position to receive the postage stamp. At this point an automatic cut-out mechanism operates to disengage the feeding and sealing rollers from the driving shaft, with the result that the envelop is held stationary in the proper position during the stamp affixing operation. The envelops are, therefore, advanced a given distance and then halted, the amount of movement of the envelop always being the same, regardless of the size of the envelop. It is evident that since the envelops are initially fed into the device with the leading ends at the same point, they will be halted with the leading ends at the same point, which is the proper point for affixing the stamp to the face of the envelop adjacent to the leading edge.

*The cut-out mechanism.*—The cut-out mechanism is arranged to start and stop the rotation of the feeding and sealing rollers at proper times and to cause the rollers to revolve to advance the envelop the required distance so that the leading or forward edge thereof is in proper position to receive the stamp. The cut-out mechanism comprises the clutch 85 which is composed of the toothed wheels 88—89, mounted respectively on the shafts 79 and 84, which wheels are adapted to be separated to stop the rotation of the rolls. The toothed wheel 88 is mounted on the sleeve 91 which is keyed to and slidable longitudinally on shaft 79. The sleeve 91 is moved by means of the lever 92 engaging therewith and pivoted at 93. The lever 92 is moved by means of the bar 94 which is slidable in the supports 95. The bar 94 is moved by means of the cams 96—97 on opposite sides of the gear 87. The bar 94 is provided with two pins 98—99 which lie on opposite sides of the gear 87, in such position that they will be alternately engaged by the cams 96—97 with the result that the bar 94 will be shifted back and forth to throw the toothed wheels into and out of contact.

In Fig. 16 I have shown the relative position of the pins 98—99, and the cams 96—97. When the cam 96 comes in contact with the pin 99 the bar 94 is shifted to open the clutch and stop the rotation of the rollers and when the gear 87 has revolved sufficiently so that cam 97 comes in contact with pin 98 the bar is moved to close the clutch and the rollers are rotated. The gear 87 makes one revolution for each complete cycle of the selecting device, or for each envelop that passes through the machine. The cams 96—97 are so placed on the face of gear 87 that the clutch will be closed only a sufficient length of time to allow the envelop to be advanced the proper distance through the machine, so that it is in position to receive the postage stamp. The feeding and sealing rollers remain stationary during the time in which the stamp affixing mechanism is operating to affix the stamp to the envelop. While they are stationary, however, the selector plate has been operating to place another envelop between the initial feed rollers, so that when the clutch is closed and the rollers revolved, an envelop is being fed into the machine.

*The stamp affixing device.*—The stamp affixing device is mounted on the bed of the machine in such position that the stamp will be affixed at the upper right hand corner of the envelop when the envelop is held stationary by the rollers. The device is supported above the bed by the legs 101 so that the stamp will be affixed at the proper place. The device is operated by means of the cam 102 to which motion is applied from the main drive shaft 4 through the gears 103—104—105—106, the worm 107 on the shaft carrying gear 106 and the gear wheel 108 mounted on the shaft carrying the cam 102 and meshing with the worm 107. These gears are so proportioned that the cam 102 will make one revolution for each complete cycle of the selecting device, the cam being so placed on the shaft that it operates the stamp affixer to affix the stamp during the time that the feeding and sealing rollers are at rest. The cam 102 is also so shaped that it operates to hold the stamp pressed against the face of the envelop for a short interval to assure proper adhesion. Motion is transferred from the cam to the affixing device by means of the horizontally disposed rod 109, which is slidable in the bearing 112, and which is provided with a small roller 113 which contacts with the face of the cam. The stamp affixing device operates to draw the stamp strip 114 from the stamp roll 115, to moisten the gummed portion of the stamp, sever it from the strip along the line of perforation and to securely press it against the envelop.

The gripping jaws 116—117 are operated by the rod 109, which in its descending stroke first closes the upper jaw 116 upon the lower jaw 117 gripping the stamp strip therebetween and then carries the same in an arc under the presser foot 118 in which movement it draws the strip 114 across and over the edge of the cutting blade 119 at a sharp angle and also across the face of the moistening pad 121 situated adjacent to the blade. At such movement the end of the strip is brought forward and at a sharp angle across the cutting blade 119 and a sufficient degree of resistance to the movement of the strip is produced by the tension plate 122, situated in advance of the blade, to cause the stamp to separate from the strip along the weakened line of the perforation by the strain that is applied on the opposite side of the blade by the gripping jaws. The center 123 on which the jaws swing is situated at a proper distance from the position which the envelop occupies to let the jaws swing to a nearly horizontal position, the extent of which is sufficient to place the stamp under the presser foot, and allow the lower jaw room to open and release the stamp.

The presser foot 118 is pivotally attached to the end of the rod 109, so that it may tilt and its outer end be caused to make contact with and press one end of the stamp against the envelop a little in advance of the moment that the opposite end thereof is released from the jaws. The presser foot bears against and slides along the upper surface of the upper jaw 116 during the forward movement of the rod 109.

The tilting movement of the presser foot 118 is effected by means of a toe-piece 124 fixed to the presser foot and extending laterally beyond its rear edge. The hooked end of the toe-piece enters an elongated slot in the jaw 116 and travels therein during the first part of the forward movement of the plunger and while the jaws retain their grip on the stamp the jaw frame 125 is being turned on its pivot 123. The toe-piece is arrested by its contact with the jaws and causes the finger 126 forming part of the presser foot to be advanced in front of the presser foot to press the stamp against the envelop in advance of the presser foot. A further movement of the presser foot causes the finger 126 to be moved backward into the plane of the presser foot thereby causing the hooked end of the toe-piece 124 to bear against the jaw 117 and move it away from jaw 116 to release the stamp. With the presser foot in this position, firmly pressing the stamp against the envelop, the roller 113 is riding over that part of the cam 102 which is concentric with its center of rotation. The stamp is, therefore, held against the envelop for a short interval of time to insure its adhesion. The roller 113 is held against the cam 102 by means of a spring which returns the rod 109 and releases the presser foot when the roller travels over the lower part of the cam.

The construction and operation of the stamp affixing device is more fully explained in my application, Serial Number 558,095, filed April 28, 1910, and it is, therefore, believed that a more detailed description thereof is unnecessary in this application.

Arranged in the frame of the machine, in line with the presser foot, is the head 127 fitted in a recess in the frame. This head 127 is so placed that it lies on the opposite side of the envelop to the presser foot, and is arranged to exert a pressure against the presser foot to assist in insuring the proper adhesion of the stamp. The head 127 is loosely mounted on the rod 128 so that the head can position itself for proper operation regardless of any irregularity in the thickness of the envelop due to the matter inserted therein. I have arranged this head 127 so that it will lie in the recess at all times except when the stamp is being applied, so that it may not interfere with the passage of the envelop through the machine. The rod carrying the head is pressed forward by means of a spring but such forward motion is restrained except at the period mentioned by means of the cam wheel 129. This cam wheel 129 is mounted on a shaft below the rod 128 and is rotated from the shaft 131 by means of the chain 132. Power is supplied to the shaft 131 from the shaft 24 through suitable gearing.

A finger 133 on the end of rod 128 bears against the cam wheel 129 and holds the head 127 in the recess except when the cam has revolved to allow the finger to drop into the recess 134 therein, in which position the head is allowed to protrude beyond the face of the frame. The cam 129 is so placed that the head protrudes only during that period of the operation when the stamp is being affixed, after which it is drawn back into the recess. The cam 129 makes one revolution for each complete cycle of the machine. After the stamp has been affixed, the sealing rollers are again thrown into operation by the automatic cut out mechanism and the sealed and stamped envelop is discharged from the machine and drops down through the chute 135 where it may be gathered up for mailing.

*The stamp-strip cut-out.*—In Figs. 17, 18, 19 and 20, I have shown the details of the stamp-strip cut-out mechanism. This mechanism operates by the non-passage of an envelop through the apparatus to remove the stamp-strip 114 from the stamp affixer mechanism, to prevent the stamps from being severed from the strip and wasted when there are no envelops in place to receive them. The operation of the mechanism is controlled by the movement of the roller 136 which is in position to register with an opening in the guide plate 35. The roller 136 is mounted on the bracket 137 which is pivoted at its other end to the bed, so that the roller can swing in and out of said hole. A bar 138 attached to the bracket 137 is engaged at its outer end by a spring 139 which tends to press the roller toward the opening in the guide plate.

The roller 136 is normally held away from the hole in the guide plate by the cam 141 engaging a pin 142 on the bar 138. During that time in the operation of the machine when an envelop should be engaging that part of the guide plate in which the hole occurs, the cam 141 has moved so that the pin 142 lies adjacent to an apertured portion therein, so that the roller 136 is allowed to move toward said hole. When an envelop is present, however, the roller cannot move into said hole and the stamp-strip cut-out does not operate. When no envelop is present, the roller 136 moves into the hole a sufficient distance to allow the pin 142 to engage the cam 143 on the cam-plate 141, which during the partial rotation of the cam-plate 141, moves the roller farther into the hole. This positive movement of the bar 138 operates to move the device by which the stamp strip is lifted from the position, so that it will not be gripped by the gripper jaws 116—117 of the stamp affixer.

The stamp strip cut-out is operated by the movement of the lever 144, which is pivoted intermediate its ends to the frame of the machine, and which moves in a substantially horizontal plane. At one end the lever is provided with a slot which engages a pin 145 fixed on the movable bar 138 and the other end of the lever is broadened and warped or bent so that it lies at an angle to the horizontal. The warped end of the lever 144 rides on the pin 161 on the vertical rod 146, so that as the lever 144 is moved on its pivot, the inclined end moving over the pin 161 causes a vertical movement of the rod 146. The rod 146 is reduced in cross section at its lower end in which the pin 161 is arranged, the shoulder formed between the reduced and full portions serving as a stop to limit the downward movement of the rod. The rod 146 is normally in its elevated position. Pivoted to the rod at its upper end is a slotted lever 147 through which the stamp strip is drawn. The lever is pivoted at 162 to a stationary part of the device and as the rod 146 is depressed, the slotted end of the lever is raised.

When the outer end of the lever 147 is raised, the prongs of the lever grip the stamp strip and raise it out of contact with the gripper jaws of the stamp affixer. When the outer end of the lever is depressed, it brings the stamp strip within the range of the gripper jaws and the prongs are separated by the pin 148, which enters the slot in the lever between the prongs, thus allowing the stamp strip to be readily drawn therethrough. The pin 148 is placed so that it enters between the ends of the prongs and does not interfere with the passage of the stamp strip. When the machine is in operation and no envelop is passing the hole in the guide plate, the lever 147 is raised to lift the stamp strip beyond the range of the gripper jaws. The stamp affixing device is not put into operation until after the stamp strip cut-out has operated, so that in the event of a non-passage of an envelop the stamp is not severed from the strip and wasted.

In order to insure the depression of the lever 147, after it has been raised to remove the stamp strip from the range of the gripper jaws, I employ the foot 149 attached to the lever 151. This foot bears against the outer end of the forked lever 147 and a downward movement thereof forces the lever down onto the pin 148, and separates the prongs so that the stamp strip may be readily drawn through. The lever 151 is operated by means of a pin 152 on the gear 108 which contacts with the lever 151 and raises the outer end thereof. The pin 152 is so placed on the gear 108 that it does not operate to depress the lever 147 until after the cam 143 has returned the operating mechanism to its normal position. This occurs after the gripper jaws have been depressed so that they will not contact with the stamp strip when it is lowered.

I claim:

1. In an envelop sealing and stamping machine, a feed table upon which the envelops are arranged, means for removing the envelops singly from said feed table, means for removing the envelops from said removing means and feeding them endwise to the main feed rollers, the main feed rollers, sealing rollers, a moistening pad arranged intermediate said feed and sealing rollers, means for rotating said feed and sealing rollers, and means for affixing a stamp to the sealed envelop.

2. In an envelop sealing and stamping machine, a feed table on which the envelops are adapted to be arranged in a substantially vertical position, a vertically reciprocating selector plate adapted to engage under the flap of the leading envelop and remove it from the table on the upward stroke, means for clamping the envelop to the plate in its downward stroke, means for releasing the clamp at the end of the downward stroke, a pair of feed rollers, means for feeding the envelop from said selector plate to the feed rollers, a pair of sealing rollers, a moistening device intermediate said feeding and sealing rollers and means for affixing a stamp to the sealed envelop.

3. In an envelop sealing and stamping machine, the combination of a feed table, a vertically reciprocable selector plate adapted to remove the envelops successively from said feed table, a guide plate having its upper edge in line with the upper edge of the selector when said selector is in the depressed position, rollers adjacent said selector plate for feeding the envelop to said guide plate, a pair of main feeding rollers on opposite sides of said guide plate beyond said feeding rollers, a pair of sealing rollers beyond said moistening device and a stamp affixing device beyond said sealing rollers.

4. In an envelop sealing and stamping machine, the combination of a feed table, a vertically reciprocable selector plate, auxiliary feed rollers on opposite sides of said plate, a guide plate in line with said selector plate provided with an aperture, feed rollers on opposite sides of said guide plate at the said aperture, a moistening pad on one side of said guide plate, a pair of sealing rollers beyond and on opposite sides of said guide plate, means for halting the rotation of said sealing rollers at a predetermined time and means for affixing a stamp to the envelop during said period of rest.

5. In an envelop sealing and stamping machine, sealing rollers, feed rollers arranged in advance of said sealing rollers, means for revolving said rollers, means arranged between said feed and sealing rollers for moistening the envelop flap, a stamp affixing device, and means for halting the revolution of said rollers while the envelop is between the sealing rollers.

6. In an envelop sealing and stamping machine, sealing rollers, feed rollers arranged in advance of said sealing rollers, means for revolving said rollers, means for starting the revolution of said rollers when the envelop is in position to be fed into the feed rollers and for halting the revolution of said rollers while the envelop is between the sealing rollers and means for affixing the stamp to the envelop while the rollers are at rest.

7. In an envelop sealing and stamping machine, a driving shaft, a driven shaft, a clutch between said shafts, envelop feeding and sealing rollers connected to said driven shaft, a stamp affixing device and means operated by the rotation of the driving shaft to operate the clutch to start and stop the rotation of the rollers.

8. In an envelop sealing and stamping machine, a stamp affixing device provided with jaws for gripping the stamp, means for removing the stamp from the range of said jaws during the non-passage of an envelop through the machine and means for feeding the envelop through the machine.

9. In an envelop sealing and stamping machine, a guide plate having an aperture therein over which the envelop passes, a roller adapted to register with said aperture at a certain time in the operation of the machine, said roller being held out of said aperture at such time by the envelop, a stamp affixer, jaws therein for gripping the stamp strip and means adapted to be operated by the movement of the roller at such time when no envelop is passing over the aperture to raise the stamp strip from within range of the jaws of the stamp affixer.

10. In an envelop sealing and stamping machine, a stamp affixing mechanism having gripper jaws a guide plate having an aperture therein, a roller held in close relation to said aperture, means for allowing the roller to move toward said aperture at a certain time in the operation of the machine, means for causing a further movement of said roller when no envelop is passing over said aperture, said means operating to remove the stamp strip from within the range of the gripper jaws of the stamp affixer.

11. In an envelop sealing and stamping machine, envelop feeding means, a stamp affixer, gripper jaws for gripping the stamp, means for removing the stamp from within range of the gripper jaws of the stamp affixer when no envelop is passing through the machine, and means for returning the stamp to its original position after the jaws have been depressed.

JOHN J. McDADE.

Witnesses:
  H. G. Prost,
  P. S. Pidwell.